United States Patent
Tomizawa et al.

(10) Patent No.: US 8,373,771 B2
(45) Date of Patent: Feb. 12, 2013

(54) IMAGING APPARATUS INCLUDING A SEARCH CONDITION SETTING UNIT FOR SETTING A SEARCH CONDITION OF IMAGE DATA AND A NON-TRANSITORY STORAGE MEDIUM STORING A PROGRAM FOR SETTING A SEARCH CONDITION OF IMAGE DATA

(75) Inventors: Masaomi Tomizawa, Hachioji (JP); Tsugumoto Kosugiyama, Hachioji (JP); Osamu Nonaka, Sagmihara (JP)

(73) Assignee: Olympus Imaging Corp., Tokyo (JP)

( * ) Notice: Subject to any disclaimer, the term of this patent is extended or adjusted under 35 U.S.C. 154(b) by 501 days.

(21) Appl. No.: 12/687,725

(22) Filed: Jan. 14, 2010

(65) Prior Publication Data

US 2010/0211589 A1    Aug. 19, 2010

(30) Foreign Application Priority Data

Feb. 18, 2009    (JP) .................. 2009-035906

(51) Int. Cl.
*H04N 5/76*    (2006.01)
(52) U.S. Cl. ................... 348/231.2
(58) Field of Classification Search ............. 348/211.99, 348/211.1, 211.2, 211.4, 211.11, 231.99, 348/231.2, 231.3
See application file for complete search history.

(56) References Cited

U.S. PATENT DOCUMENTS 6,741,271 B1 *  5/2004  McConica et al. ............ 715/839
7,068,309 B2 *  6/2006  Toyama et al. ............ 348/231.5
7,139,018 B2 * 11/2006  Grosvenor et al. ........ 348/211.3

FOREIGN PATENT DOCUMENTS

JP    2004-328039    11/2004

* cited by examiner

*Primary Examiner* — Timothy J Henn
(74) *Attorney, Agent, or Firm* — John C. Pokotylo; Straub & Pokotylo

(57) ABSTRACT

An imaging apparatus sets a search condition of image data so as to contain a condition that image data to be searched is created between a latest send image data that has most recently been sent among pieces of image data, which are read from a storage unit and sent to a display device or which are sent from either the imaging apparatus or other imaging apparatus to the display device, and image data that is created at the earliest time after the latest send image data has been created among the pieces of the image data stored in the storage unit; determines image data to be sent to the display device from among pieces of image data stored in each of the imaging apparatus and the other imaging apparatus, based on a search result sent from the other imaging apparatus as a response to the sent search condition.

13 Claims, 12 Drawing Sheets

IMAGING APPARATUS INCLUDING A SEARCH CONDITION SETTING UNIT FOR SETTING A SEARCH CONDITION OF IMAGE DATA AND A NON-TRANSITORY STORAGE MEDIUM STORING A PROGRAM FOR SETTING A SEARCH CONDITION OF IMAGE DATA

CROSS-REFERENCE TO RELATED APPLICATIONS

This application is based upon and claims the benefit of priority from Japanese Patent Application No. 2009-035906, filed on Feb. 18, 2009, the entire contents of which are incorporated herein by reference.

BACKGROUND OF THE INVENTION

1. Field of the Invention

The present invention relates to an imaging apparatus that captures an image and creates electronic image data of the image.

2. Description of the Related Art

In imaging apparatuses including digital cameras that capture an image and create electronic image data, functions of playing pack captured images on other apparatuses or transmitting the image data to and receiving the image data from the other apparatuses via communication have increasingly been used in recent years. In such circumstances, there has been proposed a technology for capturing and playing back images by cooperation of a plurality of digital cameras (see, for example, Japanese Patent Application Laid-open No. 2004-328039).

In this technology, when a plurality of digital cameras performs cooperative shooting, related information among images containing a cooperative shooting ID, an order of shooting, and a camera ID is created and stored in a predetermined digital camera (a master digital camera). Besides, when images that have been cooperatively captured are played back, the digital camera having the related information receives image data from other digital cameras, and appropriately performs processing such as sorting to successively play back the images.

However, in the above-mentioned conventional technology, when the number of cooperatively-captured images increases, the amount of data of the related information to be created by the master digital camera extremely increases. Therefore, there has been a problem that loads on the master digital camera extremely increase when a process of successively playing back the images is performed with use of the related information.

SUMMARY OF THE INVENTION

According to an aspect of the present invention, there is provided an imaging apparatus configured to capture an image and create electronic image data of the image, the imaging apparatus including a communicating unit that transmits and receives information including the image data to and from each of other imaging apparatus having same configuration and a display device that displays the image; a storage unit that stores therein the image data of the image captured by the imaging apparatus; a searching unit that searches for image data that satisfies a predetermined condition among pieces of the image data stored in the storage unit; a search-condition setting unit that sets a search condition of image data so as to contain a condition that the image data to be searched is created between a latest send image data that has most recently been sent among pieces of image data sent from either the imaging apparatus or the other imaging apparatus to the display device and image data that is created at the earliest time after the latest send image data has been created among the pieces of image data stored in the storage unit; a send-image-data determining unit that determines image data to be sent to the display device among the pieces of image data stored in each of the imaging apparatus and the other imaging apparatus, based on a search result sent from the other imaging apparatus as a response to the search condition that has been set by the search-condition setting unit and sent to the other imaging apparatus; and a control unit that performs control of causing corresponding one of the imaging apparatus and the other imaging apparatus to send, every time the send-image-data determining unit determines image data to be sent to the display device, the image data determined by the send-image-data determining unit to the display device.

According to another aspect of the present invention, there is provided a recording medium that stores therein an imaging apparatus program that, when executed by an imaging apparatus, the imaging apparatus including an imaging unit that captures an image and creates electronic image data of the image and a storage unit that stores therein the created image data, causes the imaging apparatus to transmit and receive information including the image data to and from each of other imaging apparatus having same configuration and a display unit that displays the image, wherein the imaging apparatus program causes the imaging apparatus to repeatedly execute setting a search condition of image data so as to contain a condition that the image data to be searched is created between a latest send image data that has most recently been sent among pieces of image data, the pieces of image data being read from the storage unit and sent to the display device or being sent from either the imaging apparatus or the other imaging apparatus to the display device, and image data that is created at the earliest time after the latest send image data has been created among the pieces of the image data stored in the storage unit; sending a search request of image data based on the search condition set at the setting; receiving a search result sent from the other imaging apparatus as a response to the search request sent at the sending; determining image data to be sent to the display device from among the pieces of image data stored in each of the imaging apparatus and the other imaging apparatus; and controlling to cause corresponding one of the imaging apparatus and the other imaging apparatus to send, when the image data to be sent to the display device is determined at the determining, the image data determined at the determining to the display device.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
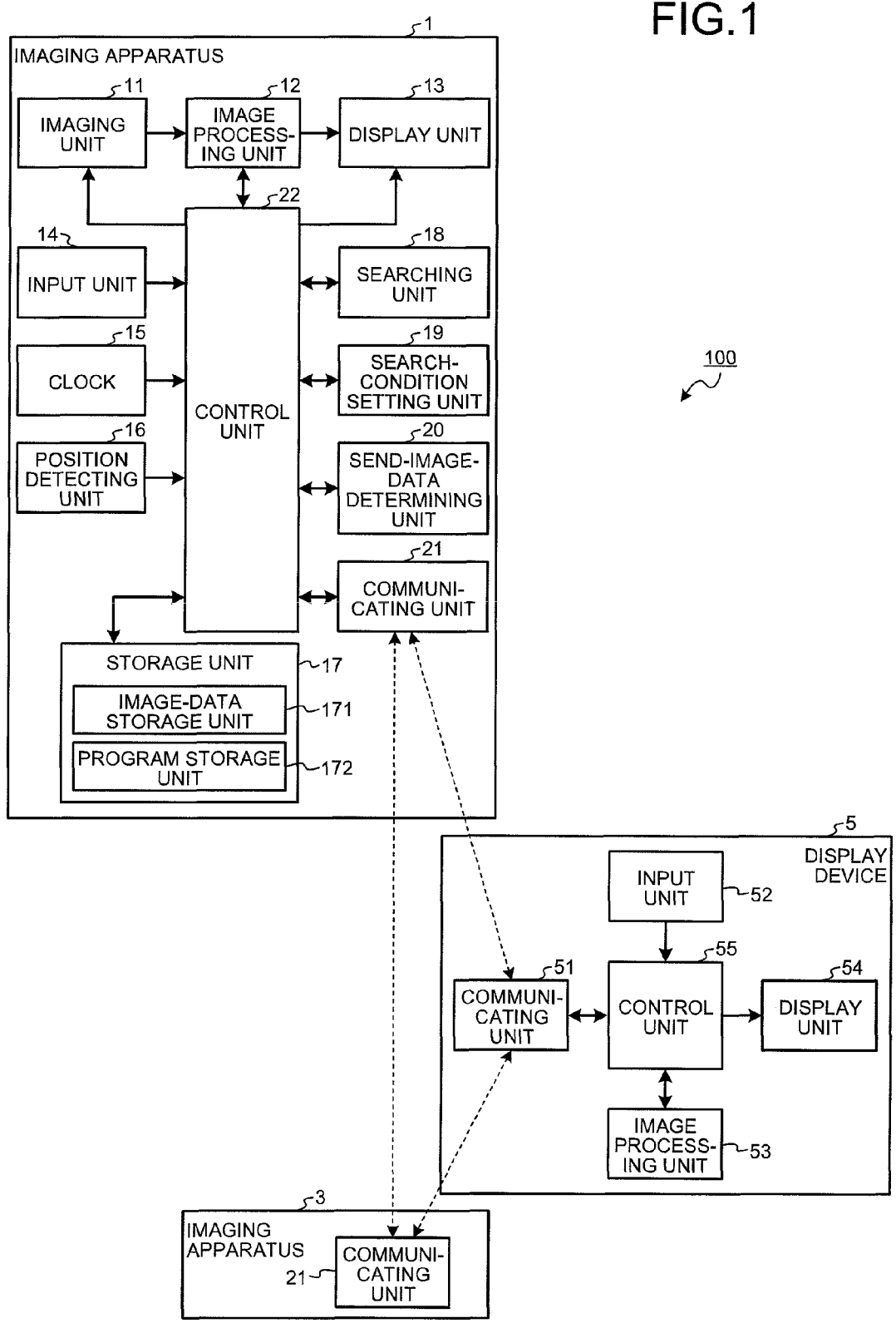
FIG. 1 is a schematic diagram illustrating a configuration of an image communication system that includes an imaging apparatus according to a first embodiment of the present invention.

FIG. 1 is a schematic diagram illustrating a configuration of each of an imaging apparatus according to a first embodiment of the present invention and an image communication system that includes the imaging apparatus. An image communication system 100 illustrated in the drawing includes two imaging apparatuses 1 and 3, each of which captures an image in a predetermined viewing range and creates image data of the image, and a display device 5 that displays the image. The imaging apparatuses 1, 3, and the display device 5 can transmit and receive information including the image data to and from each another.

The imaging apparatus 1 includes an imaging unit 11 that captures an image of a predetermined viewing range and creates digital image data of the image, an image processing unit 12 that performs predetermined image processing on the image data created by the imaging unit 11, a display unit 13 that displays the image data that has been subjected to the processing by the image processing unit 12, an input unit 14 that receives input of various types of information including operating instructions for the imaging apparatus 1, a clock 15 that is equipped with a shooting date and time determination function and a timer function, a position detecting unit 16 that receives information sent by a GPS (Global Positioning System) to thereby detect a position of the imaging apparatus 1, a storage unit 17 that stores therein pieces of image data of images captured by the imaging apparatus 1, a searching unit 18 that searches the pieces of the image data stored in the storage unit 17 for image data that satisfies a predetermined condition, a search-condition setting unit 19 that sets a condition of image data to be searched for by the imaging apparatus 3, a send-image-data determining unit 20 that determines image data to be sent to the display device 5, a communicating unit 21 that performs wireless communication by wireless LAN, infrared communication, and the like with each of the imaging apparatus 3 and the display device 5, and a control unit 22 that controls operation of the imaging apparatus 1.

The imaging unit 11 is formed of a single or plural lenses, and includes an optical system that focuses light from a subject located in a predetermined viewing range, an aperture that adjusts the amount of light to be entered among the light focused by the optical system, an imaging device such as a CCD (Charge Coupled Device) that receives light that has passed through the aperture and then converts the light into an electrical signal, and an A/D converting unit that converts an analog signal output from the imaging device into image data formed of a digital signal.

The display unit 13 is formed of liquid crystal, organic EL, or the like, and appropriately displays image data, operational information of the imaging apparatus 1, and information related to shooting.

The input unit 14 includes a power button for the imaging apparatus 1, a shutter button for giving a shooting instruction, a mode switch button for switching various operation modes that can be set in the imaging apparatus 1 from one to the other, a control button containing instructions to play back or edit image data, and the like. As a part of the input unit 14, a touch panel can be arranged on the display unit 13.

The storage unit 17 includes an image-data storage unit 171 that stores therein image data that has been crated by the imaging unit 11 and subjected to the processing performed by the image processing unit 12, and a program storage unit 172 that stores therein various types of computer programs including a program for an imaging apparatus according to the first embodiment, which are to be executed by the imaging apparatus 1. The storage unit 17 is formed of a semiconductor memory, such as a flash memory or a RAM, which is fixedly mounted inside the imaging apparatus 1. The storage unit 17 can be equipped with a function as a recording medium interface to record information in an externally-mountable recording medium, such as a memory card, and read out information recorded in the recording medium.

The control unit 22 is formed of an MPU (Micro Processing Unit) and the like, and is connected to each component of the imaging apparatus 1 that is a controlled object via a bus line.

The imaging apparatus 3 has the same configuration as the imaging apparatus 1. In FIG. 1, only the communicating unit 21 of the imaging apparatus 3 is illustrated for simplification of the description.

Figure 2:
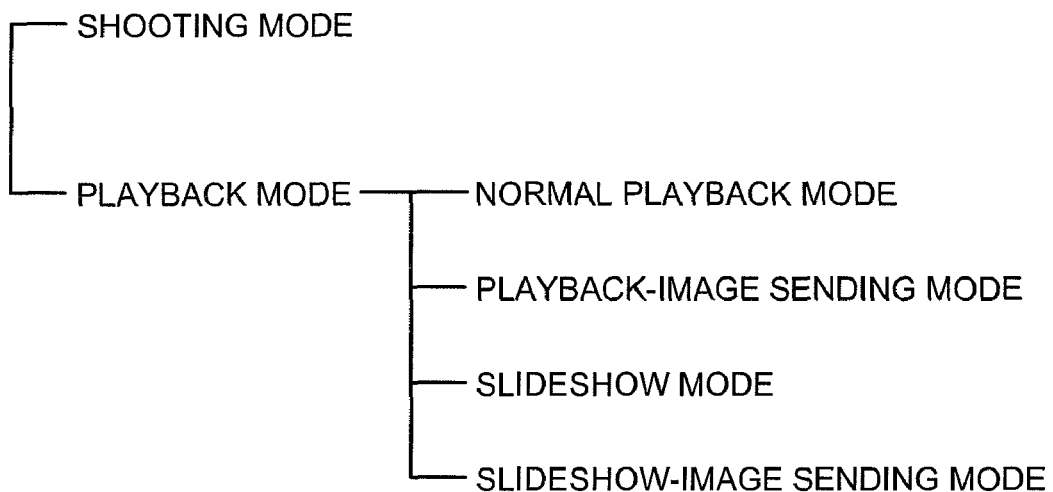
FIG. 2 is a schematic diagram illustrating types of typical modes that can be set in the imaging apparatus according to the first embodiment.

FIG. 2 is a schematic diagram illustrating types of typical modes that can be set in each of the imaging apparatuses 1 and 3 configured as described above. In each of the imaging apparatuses 1 and 3, at least a shooting mode in which an image is captured and a playback mode in which a captured image is played back can be set. Among them, as the playback mode, four different modes, i.e., a normal playback mode, a playback-image sending mode, a slideshow mode, and a slideshow-image sending mode, can be set. The normal playback mode is a mode in which an image that has been selected via the input unit 14 from among images stored in the storage unit 17 is played back for display on the display unit 13. The playback-image sending mode is a mode in which image data of an image that is being played back for display on the display unit 13 is sent to the display device 5. The slideshow mode is a mode in which predetermined images among the images stored in the storage unit 17 are sequentially played back for display on the display unit 13. The slideshow-image sending mode is a mode in which image data of images to be displayed as slideshow on the display device 5 are sequentially sent to the display device 5 in cooperation with the imaging apparatus 3.

Next, a configuration of the display device 5 is described. The display device 5 includes a communicating unit 51 that transmits and receives information including image data to and from each of the imaging apparatuses 1 and 3, an input unit 52 that receives input of various types of information including operating instructions, an image processing unit 53 that performs predetermined processing on image data sent from each of the imaging apparatuses 1 and 3, a display unit 54 that displays an image corresponding to the image data that has been subjected to the processing by the image processing unit 53, and a control unit 55 that controls operation of the display device 5.

The display unit 54 is formed of liquid crystal, organic EL, or the like. The display unit 54 with a large screen may be preferable to allow a large group of people to view an image together.

The display device 5 having the above configuration can be formed of one of a television, a projector, a personal computer, and a digital photo frame. In this configuration, the display device 5 is preferably equipped with a display switching means that switches over display of an image of image data sent from each of the imaging apparatuses 1 and 3 and display of an image obtained by other functions from one to the other.

Figure 3:
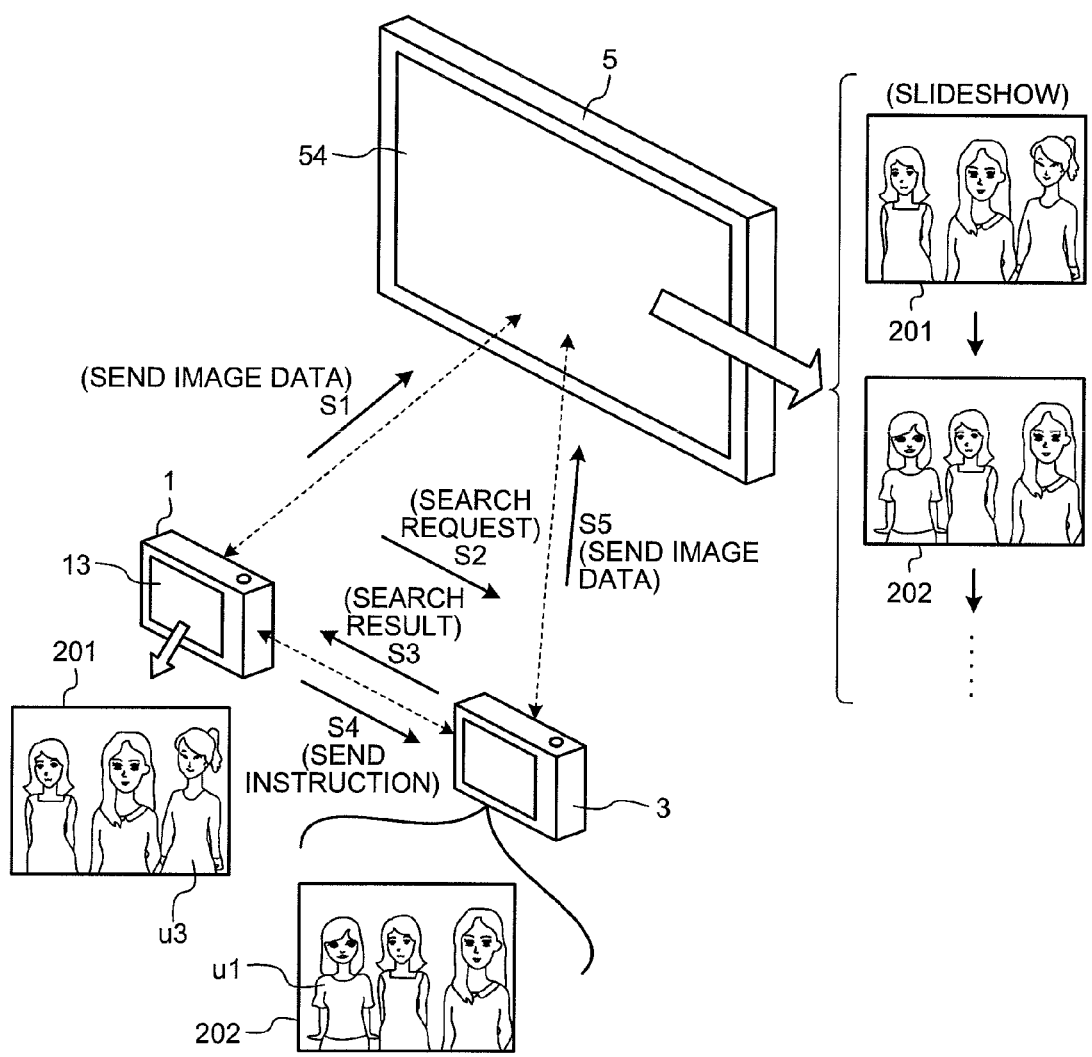
FIG. 3 is a schematic diagram illustrating an outline of a process performed specifically by the image communication system that includes the imaging apparatus according to the first embodiment.

FIG. 3 is a schematic diagram illustrating an outline of a process performed specifically by the image communication system 100 having the above configuration, in a state where each of the imaging apparatuses 1 and 3 is set to the slideshow-image sending mode. FIG. 3 illustrates an example in which a user u1 of the imaging apparatus 1 and a user u3 of the imaging apparatus 3 alternately display captured images as slideshow on the display device 5. An image 201 is captured by the user u1 with use of the imaging apparatus 1, and contains three people including the user u3 as subjects. An image 202 is captured by the user u3 with use of the imaging apparatus 3, and contains three people including the user u1 as subjects. The two people other than the user u3 in the image 201 are identical to the two people other than the user u1 in the image 202, respectively. In the following descriptions, it is assumed that the image 201 is captured earlier than the image 202 for convenience of explanation.

In FIG. 3, the imaging apparatus 1 sends image data of the image 201 that is being played back for display on the display unit 13 (Step S1), and then, sends to the imaging apparatus 3 a search request to search for image data corresponding to predetermined search conditions (Step S2). The search conditions contain at least a condition that the image data is created within a predetermined time after creation date-time of the image data of the image 201. The imaging apparatus 3 that has received the search request performs a search, and sends a search result to the imaging apparatus 1 (Step S3). In the example illustrated in FIG. 3, the imaging apparatus 3 sends information about image data of the image 202 as the search result to the imaging apparatus 1. The imaging apparatus 1 that has received the search result from the imaging apparatus 3 sends to the imaging apparatus 3 a send instruction to send the image data of the image 202 to the display device 5 (Step S4). The imaging apparatus 3 sends to the display device 5 the image data of the image 202 in accordance with the send instruction that has been received from the imaging apparatus 1 (Step S5).

Through the processes at Steps S1 to S5, which are performed by the imaging apparatuses 1 and 3 in cooperation with each other, the display unit 54 of the display device 5 displays the image data of the image 201 and the image data of the image 202 in this order. The processes at Steps S1 to S5 are repeatedly performed to display the slideshow on the display unit 54 based on the images captured by each of the imaging apparatuses 1 and 3. Thus, variety of slideshow containing a combination of images that are captured by different imaging apparatuses can be displayed on the display unit 54.

Figure 4:
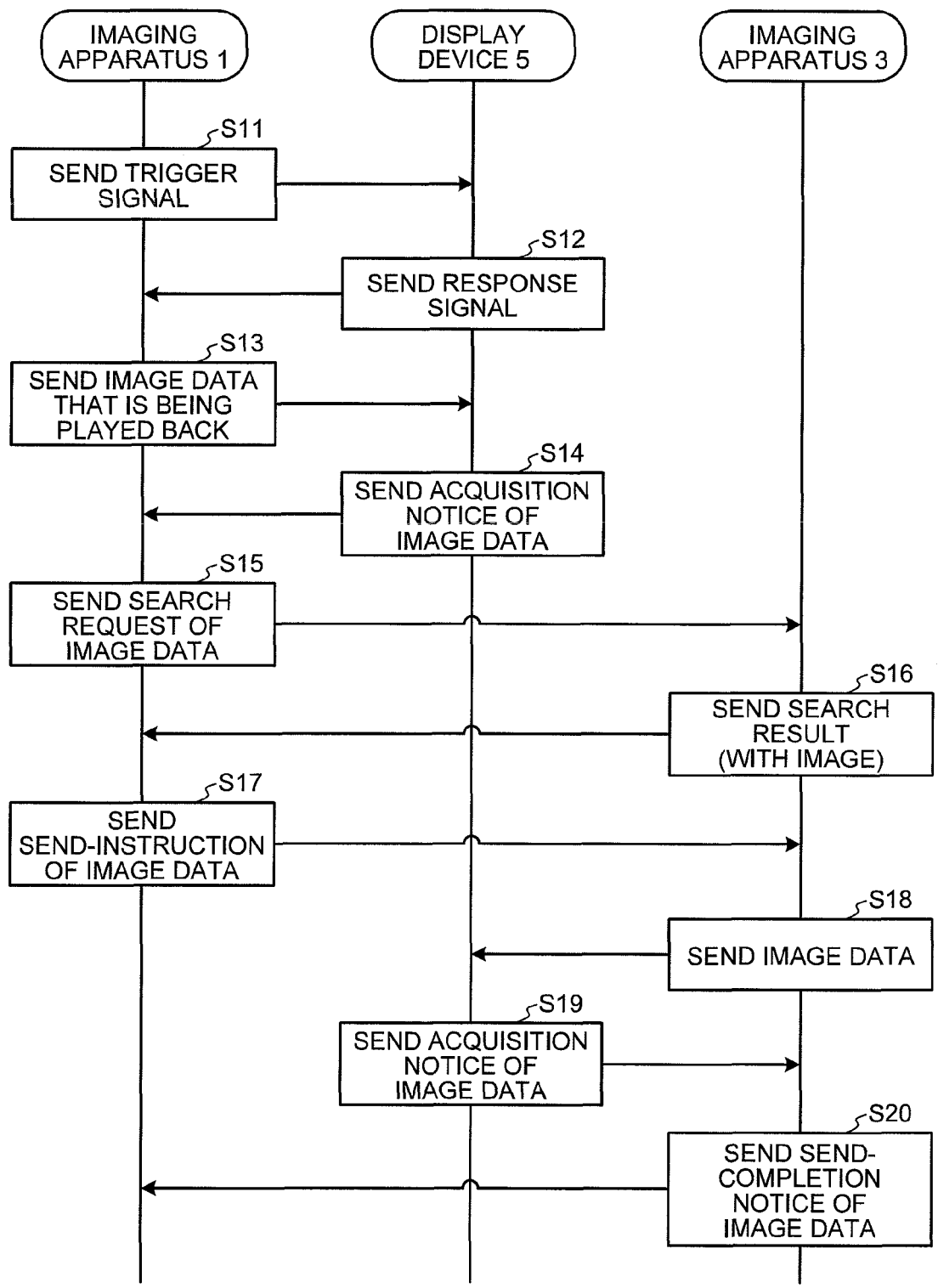
FIG. 4 is a schematic diagram illustrating an outline of a communication sequence performed by the image communication system according to the first embodiment.

FIG. 4 is a schematic diagram illustrating an outline of a communication sequence performed by the image communication system 100, which corresponds to a situation illustrated in FIG. 3, i.e., a diagram illustrating an outline of communication in which the imaging apparatuses 1 and 3 sequentially send image data and the display device 5 displays slideshow.

As shown in FIG. 4, the imaging apparatus 1 sends a trigger signal to the display device 5 (Step S11). When receiving the trigger signal, the display device 5 sends a response signal of the trigger signal to the imaging apparatus 1 (Step S12). Accordingly, communication between the imaging apparatus 1 and the display device 5 is established, and communication between the imaging apparatus 3 and the display device 5 is also enabled.

The imaging apparatus 1 that has received the response signal from the display device 5 sends image data of an image that is being played back on the display unit 13 (corresponding to the image 201 of FIG. 3) (Step S13). This process corresponds to the process at Step S1 of FIG. 3. The display device 5 that has received the image data from the imaging apparatus 1 sends an acquisition notice of the image data to the imaging apparatus 1 (Step S14).

The imaging apparatus 1 that has received the acquisition notice of the image data from the display device 5 sends a search request to search for image data based on predetermined search conditions to the imaging apparatus 3 (Step S15). This process corresponds to the process at Step S2 of FIG. 3.

The imaging apparatus 3 that has received the search request from the imaging apparatus 1 sends a search result that has been obtained by the searching unit 18 thereof to the imaging apparatus 1 (Step S16). This process corresponds to the process at Step S3 of FIG. 3. In FIG. 4, it is assumed that image data corresponding to the search conditions is present, so that the search result sent by the imaging apparatus 3 contains information about the image data.

The imaging apparatus 1 that has received the search result from the imaging apparatus 3 sends to the imaging apparatus 3 a send instruction to send the image data contained in the search result to the display device 5 (Step S17). This process corresponds to the process at Step S4 of FIG. 3.

The imaging apparatus 3 that has received the send instruction of the image data from the imaging apparatus 1 sends the designated image data to the display device 5 (Step S18). This process corresponds to the process at Step S5 of FIG. 3.

The display device 5 that has received the image data from the imaging apparatus 3 sends an acquisition notice of the image data to the imaging apparatus 3 (Step S19). The imaging apparatus 3 that has received the acquisition notice of the image data from the display device 5 sends a send-completion notice of the image data to the imaging apparatus 1 (Step S20).

In this manner, the imaging apparatuses 1 and 3 sequentially send image data of images to be displayed as slideshow to the display device 5.

Figure 5:
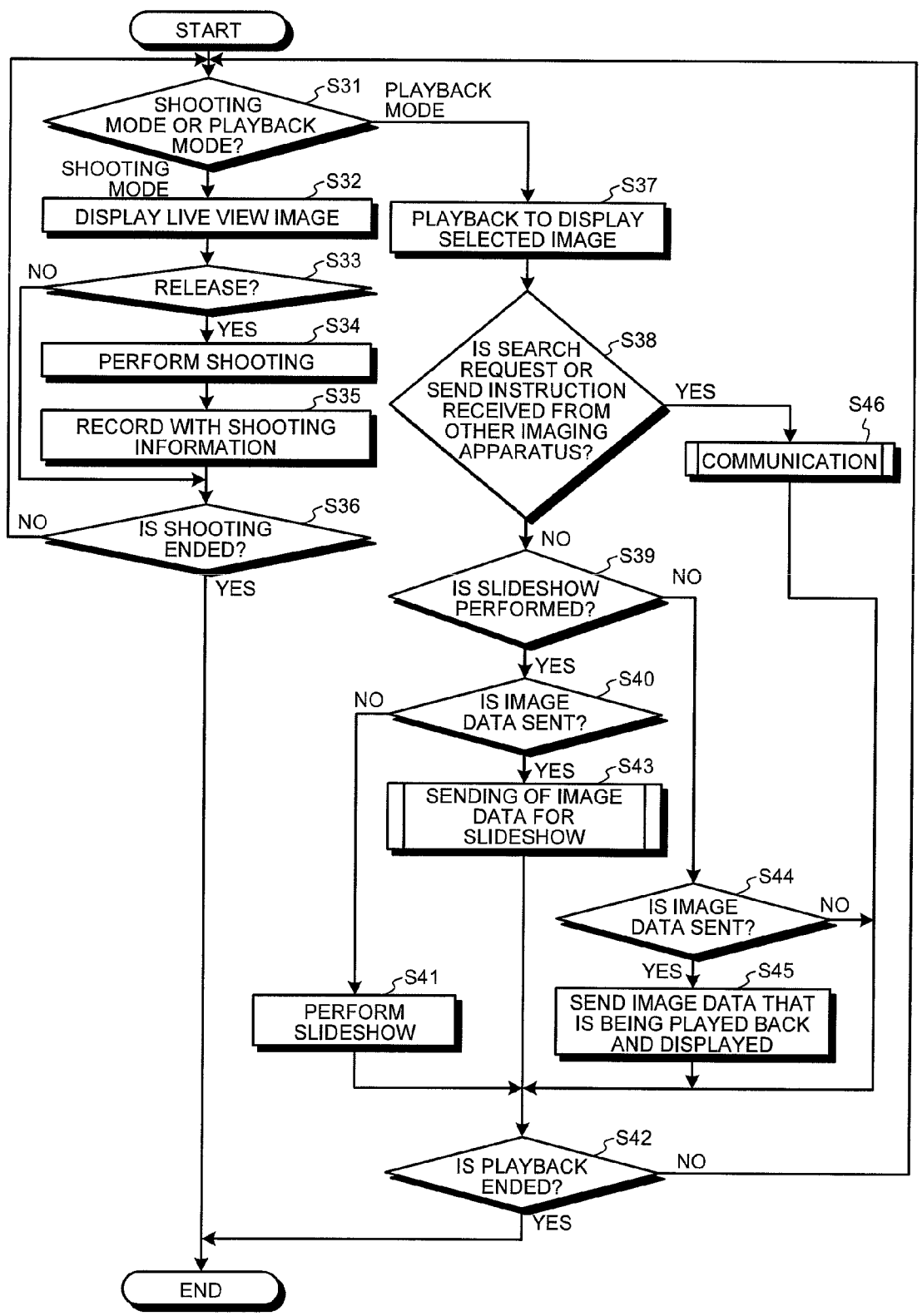
FIG. 5 is a flowchart illustrating an outline of a process performed when the imaging apparatus according to the first embodiment is set to either a shooting mode or a playback mode.

FIG. 5 is a flowchart illustrating an outline of a process performed when the imaging apparatus 1 is set to either the shooting mode or the playback mode. When the imaging apparatus 1 is set to the shooting mode (SHOOTING MODE at Step S31), the display unit 13 displays an image (a live view image) that is being captured by the imaging unit 11 (Step S32). When a release button as a part of the input unit 14 is pressed and a release signal is thereby input (YES at Step S33), the imaging unit 11 performs shooting of an image under control of the control unit 22 (Step S34). Then, the control unit 22 adds data-creation date-time and information about a shooting position to image data that has been created by the imaging unit 11 and subjected to the image processing by the image processing unit 12, by reference to output from each of the clock 15 and the position detecting unit 16, and writes in to record the image data in the storage unit 17 (Step S35).

Then, when an end instruction to end the shooting is input by the input unit 14 (YES at Step S36), the imaging apparatus 1 ends a series of processing. In contrast, when the end instruction is not input by the input unit 14 (NO at Step S36), the process by the imaging apparatus 1 returns to Step S31.

When the release button is not pressed at Step S33 (NO at Step S33), the process by the imaging apparatus 1 proceeds to Step S36.

Next, a process performed when the imaging apparatus 1 is set to the playback mode (PLAYBACK MODE at Step S31) is described. In this case, the imaging apparatus 1 plays back to display on the display unit 13 a captured image that has been selected in accordance with input from the input unit 14 (Step S37). When the process at Step S37 is performed, a user is allowed to input an instruction to select an image to be played back for display or an instruction to delete an image via the input unit 14.

A process subsequent to Step S37 depends on if the imaging apparatus 1 receives either a search request of image data or a send instruction of image data from the imaging apparatus 3. A process performed when the imaging apparatus 1 does not receive the search request and the send instruction of the image data from the imaging apparatus 3 (NO at Step S38) is described.

When the imaging apparatus 1 performs slideshow (YES at Step S39), and does not send the image data (NO at Step S40), that is, when the imaging apparatus 1 is set to the slideshow mode, the imaging apparatus 1 performs slideshow of own images captured by itself on the display unit 13 (Step S41). At Step S41, the imaging apparatus 1 reads out images that satisfy a preset slideshow continuing condition from the storage unit 17 and successively plays back to display the images on the display unit 13. Then, the imaging apparatus 1 displays a message "continue?" or the like on the display unit 13 to urge the user to select whether to continue playback of the images. When an instruction to end the playback of the images is input by the input unit 14 (YES at Step S42), the imaging apparatus 1 ends a series of processing. In contrast, when the instruction to end the playback of the images is not input by the input unit 14 (NO at Step S42), the process by the imaging apparatus 1 returns to Step S31.

When the imaging apparatus 1 performs the slideshow (YES at Step S39), and sends the image data (YES at Step S49), that is, when the imaging apparatus 1 is set to the slideshow-image sending mode, the imaging apparatus 1 sends to the display device 5 image data for the slideshow to be displayed on the display device 5, in cooperation with the imaging apparatus 3 (Step S43), and the process proceeds to Step S42.

When the imaging apparatus 1 does not perform the slideshow at Step S39 (NO at Step S39), and sends the image data (YES at Step S44), that is, when the imaging apparatus 1 is set to the playback-image sending mode, the display unit 13 sends image data of an image that is being played back and displayed on the display unit 13 to the display device 5 (Step S45), and the process proceeds to Step S42. In contrast, when the imaging apparatus 1 does not perform the slideshow (NO at Step S39), and does not send the image data (NO at Step S44), that is, when the imaging apparatus 1 is set to the normal playback mode, the process by the imaging apparatus 1 directly proceeds to Step S42.

Next, a process performed when the imaging apparatus 1 receives either the search request or the send instruction from the imaging apparatus 3 after Step S37 (YES at Step S38) is described. This corresponds to a case where the imaging apparatus 3 sends a trigger signal to the display device 5. In this case, the imaging apparatus 1 performs communication corresponding to a communication signal received from the imaging apparatus 3 (Step S46), and the process proceeds to Step S42.

Figure 6:
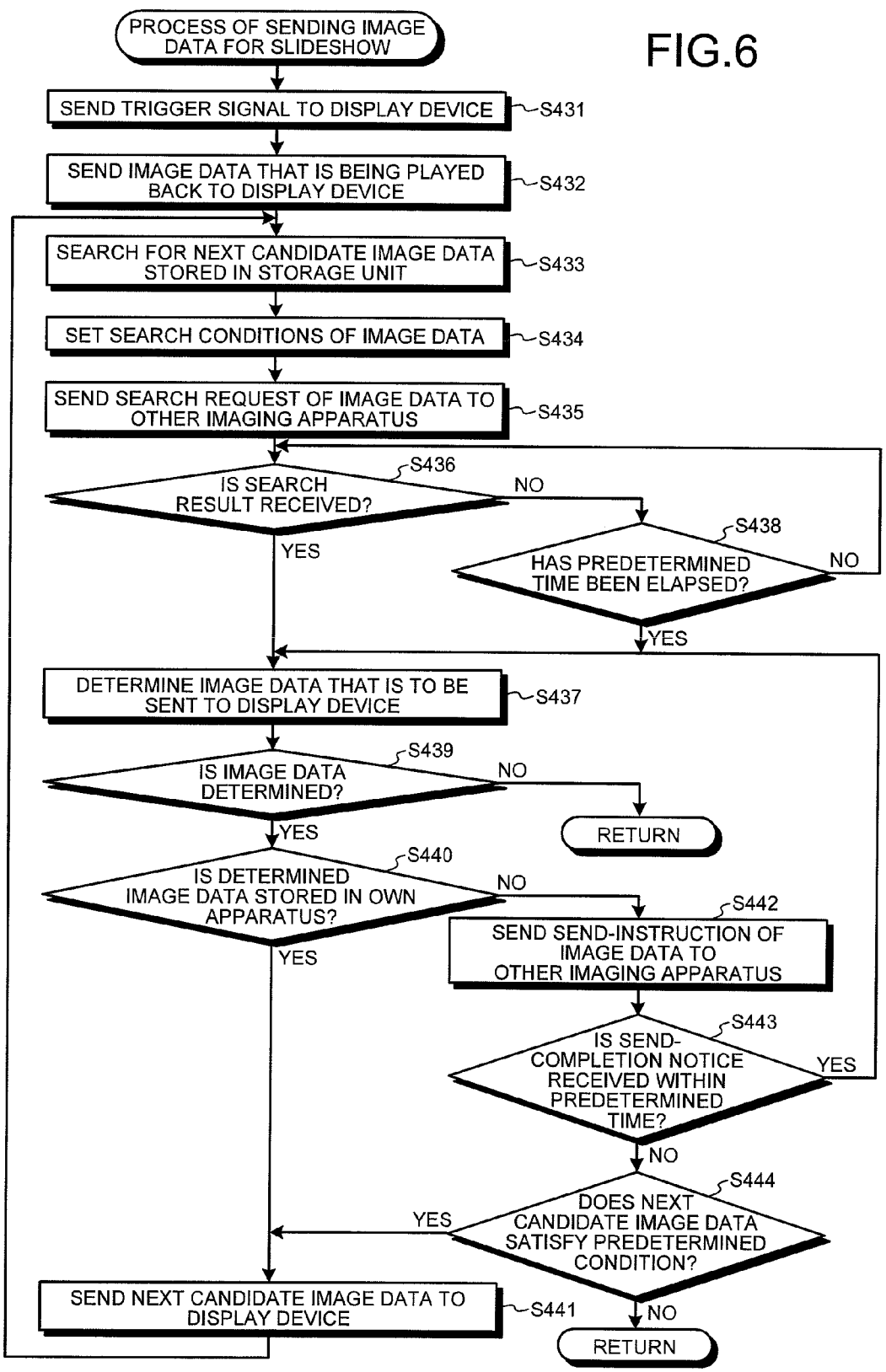
FIG. 6 is a flowchart illustrating details of a process of sending image data for slideshow, which is performed by the imaging apparatus according to the first embodiment.

FIG. 6 is a flowchart illustrating details of a process of sending image data for slideshow, which is performed at Step S43. As shown in FIG. 6, the imaging apparatus 1 sends a trigger signal to the display device 5 (Step S431).

Then, the imaging apparatus 1 sends image data of an image that is being played back on the display unit 13 to the display device 5 (Step S432). It is assumed here that a response to the trigger signal is received from the display device 5 within a predetermined time. If the response is not received from the display device 5 within the predetermined time, the imaging apparatus 1 ends a series of processing and returns the process to the main routine illustrated in FIG. 4. Thus, it is assumed in FIG. 6 that when the imaging apparatus 1 performs communication with each of the imaging apparatus 3 and the display device 5, a response has to be received within a predetermined time, and, when the response is not received within the predetermined time, the imaging apparatus 1 ends a series of processing and returns the process to the main routine as described above.

The searching unit 18 searches the storage unit 17 for image data that is stored subsequent to the image data that has been sent at Step S432 (Step S433).

Then, the search-condition setting unit 19 sets search conditions based on the image data that has been searched for at Step S433 and the image data that has been sent just before the search is performed (Step S434). The search conditions set at this step contain a condition "image data to be searched is created between a) latest send image data that has most recently been sent among pieces of image data sent by either the communicating unit 21 or the imaging apparatus 3 to the display device 5 and b) the image data that has been searched for at Step S433 (i.e., image data that is created at the earliest time after the latest send image data has been created among pieces of the image data stored in the storage unit 17)". It is possible to add to the search conditions a condition "a shooting location of an image of the image data to be searched is within a predetermined area from a shooting location of an image of the latest send image data".

Then, the imaging apparatus 1 sends a search request of image data based on the search conditions set at Step S434 to the imaging apparatus 3 (Step S435). The imaging apparatus 3 that has received the search request from the imaging apparatus 1 causes the searching unit 18 thereof to search for the image data based on the received search conditions. When it is detected that the image data corresponding to the search conditions is present as a result of the search by the searching unit 18, the imaging apparatus 3 sends to the imaging apparatus 1 information such as creation date-time of the image data as a search result. When a plurality of pieces of image data corresponding to the search conditions are present, the imaging apparatus 3 sends to the imaging apparatus 1 information corresponding to each of the pieces of the image data as the search result. When the image data corresponding to the search conditions is not present, the imaging apparatus 3 sends to the imaging apparatus 1 information indicating this state as the search result. When the pieces of the image data corresponding to the search conditions are present, it is possible to send only a piece of image data that is created at the earliest time among the pieces of the image data.

Then, when the imaging apparatus 1 receives the search result from the imaging apparatus 3 (YES at Step S436), the send-image-data determining unit 20 determines image data to be sent next to the display device 5 based on the received search result (Step S437). More specifically, when the imaging apparatus 3 has image data that satisfies the search conditions, the send-image-data determining unit 20 determines this image data as the data to be sent. When the imaging apparatus 3 does not have image data that satisfies the search conditions, and when next candidate image data that has been searched for at Step S433 is created within a predetermined time after the creation of the latest send image data, the send-image-data determining unit 20 determines that the next candidate image data is the image data to be sent. When the send-image-data determining unit 20 determines conformity of the next candidate image data, it is possible to additionally employ a condition that a shooting location of an image corresponding to the next candidate image data is near a shooting location of the image of the latest send image data.

When the imaging apparatus 1 does not receive the search result from the imaging apparatus 3 (NO at Step S436), and if a predetermined time has not elapsed since the imaging apparatus 1 has sent the search request of the image data to the imaging apparatus 3 (NO at Step S438), the process returns to Step S436. In contrast, when the imaging apparatus 1 does not receive the search result from the imaging apparatus 3 (NO at Step S436), and if the predetermined time has elapsed since the imaging apparatus 1 has sent the search request of the image data to the imaging apparatus 3 (YES at Step S438), the send-image-data determining unit 20 performs a determination process of determining image data to be sent (Step S437). The determination process at this time is the same as that performed when the imaging apparatus 3 does not have the image data that satisfies the search conditions.

When the send-image-data determining unit 20 determines the image data to be sent (YES at Step S439), and if the image data is stored in the storage unit 17 of the imaging apparatus 1 (YES at Step S440), the control unit 22 performs control of reading the image data from the storage unit 17 and sending the image data to the display device 5 via the communicating unit 21 (Step S441).

When the send-image-data determining unit 20 determines the image data (YES at Step S439), and if the image data is stored in the storage unit 17 of the imaging apparatus 3 (NO at Step S440), the control unit 22 performs control of creating a send instruction to send the image data to the display device 5 and sending the send instruction to the imaging apparatus 3 via the communicating unit 21 (Step S442). Then, the imaging apparatus 3 that has received the send instruction of the image data from the imaging apparatus 1 sends corresponding image data to the display device 5, and then sends a send-completion notice of the image data to the imaging apparatus 1 (see Steps S18 and S20 of FIG. 4).

When the imaging apparatus 1 receives the send-completion notice of the image data from the imaging apparatus 3 within a predetermined time since the send instruction of the image data has been sent (YES at Step S443), the process returns to Step S437. The reason why the process by the imaging apparatus 1 returns to Step S437 is that the imaging apparatus 1 might have received information of a plurality of pieces of image data corresponding to the search conditions from the imaging apparatus 3.

When the imaging apparatus 1 does not receive the send-completion notice from the imaging apparatus 3 within the predetermined time since the send instruction of the image data has been sent (NO at Step S443), the send-image-data determining unit 20 determines whether the next candidate image data that has been searched for by the searching unit 18 satisfies predetermined conditions. The conditions for the determination at this time are the same as those used when the conformity of the next candidate image data is determined at the above-mentioned Step S437. As a result of the determination, when the next candidate image data satisfies the predetermined conditions (YES at Step S444), the imaging apparatus 1 sends the image data to the display device 5 (Step S441). In contrast, when the next candidate image data that has been searched for at Step S433 does not satisfy the predetermined conditions (NO at Step S444), the imaging apparatus 1 ends a series of processing and returns the process to the main routine.

When the send-image-data determining unit 20 does not determine the image data to be sent to the display device 5 at Step S439 (NO at Step S439), the imaging apparatus 1 ends a series of processing and returns the process to the main routine.

Figure 7:
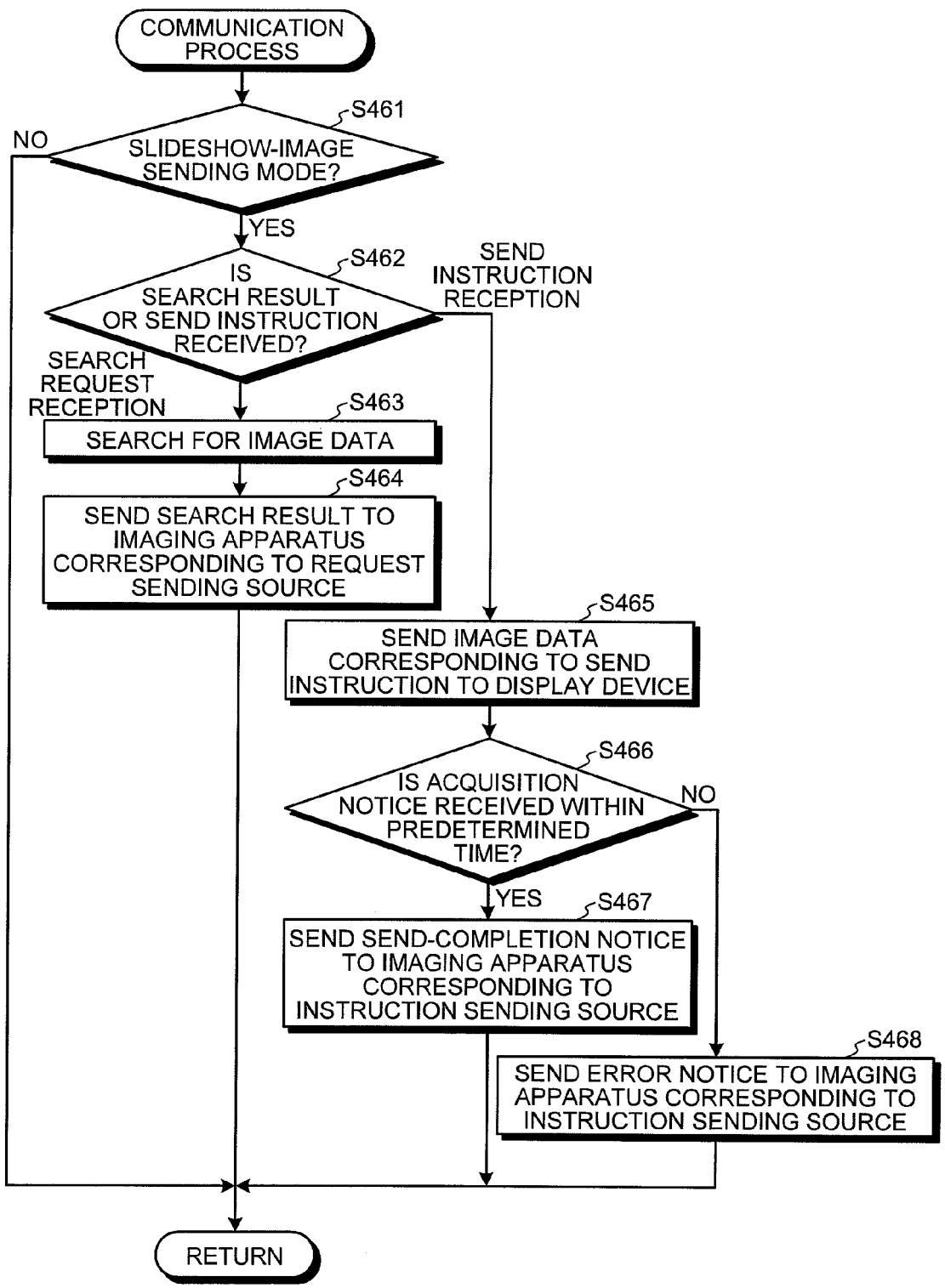
FIG. 7 is a flowchart illustrating details of a communication process performed by the imaging apparatus according to the first embodiment.

FIG. 7 is a flowchart illustrating details of the communication process performed at Step S46. As shown in FIG. 7, when the imaging apparatus 1 is not set to the slideshow-image sending mode (NO at Step S461), the process by the imaging apparatus 1 returns to the main routine.

A processes performed when the imaging apparatus 1 is set to the slideshow-image sending mode (YES at Step S461) is described below. In this case, when the imaging apparatus 1 receives the search request of image data from the imaging apparatus 3 (SEARCH REQUEST RECEPTION at Step S462), the imaging apparatus 1 searches for the image data based on the received search conditions (Step S463), and sends a search result to the imaging apparatus 3 (an imaging apparatus as a request sending source) (at Step S464). Then, the process returns to the main routine and proceeds to Step S42.

When the imaging apparatus 1 receives the send instruction of the image data from the imaging apparatus 3 (SEND INSTRUCTION RECEPTION at Step S462), the imaging apparatus 1 sends image data corresponding to the send instruction to the display device 5 (Step S465). Then, when the imaging apparatus 1 receives an acquisition notice from the display device 5 within a predetermined time (YES at Step S466), the imaging apparatus 1 sends a send-completion notice to the imaging apparatus 3 (an imaging apparatus as an instruction sending source) (Step S467), and the process returns to the main routine. In contrast, when the imaging apparatus 1 does not receive the acquisition notice from the display device 5 within the predetermined time since the imaging apparatus 1 has sent the image data (NO at Step S466), the imaging apparatus 1 sends an error notice to the imaging apparatus 3 (Step S468), and the process returns to the main routine.

Figure 8:
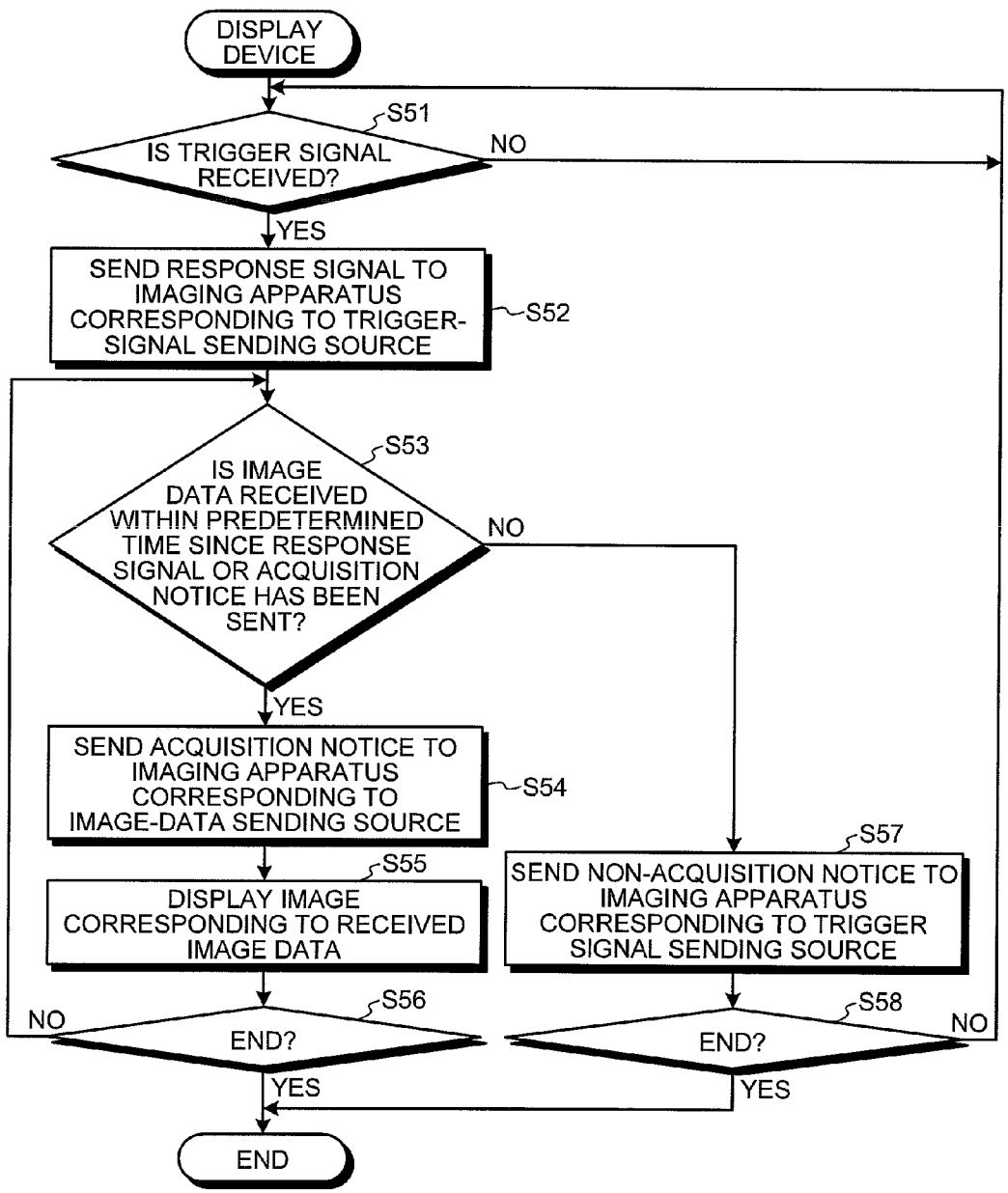
FIG. 8 is a flowchart illustrating an outline of a process performed by a display device.

FIG. 8 is a flowchart illustrating an outline of a process performed by the display device 5. When receiving a trigger signal from either one of the imaging apparatuses 1 and 3 (YES at Step S51), the display device 5 sends a response signal to the imaging apparatus corresponding to a trigger-signal sending source (Step S52). When the display device 5 does not receive the trigger signal from both the imaging apparatuses 1 and 3 (NO at Step S51), the display device 5 remains in a standby state in which the process at Step S51 is repeated.

When the display device 5 receives image data from either one of the imaging apparatuses 1 and 3 within a predetermined time since the display device 5 has sent the response signal (YES at Step S53), the display device 5 sends an acquisition notice to the imaging apparatus corresponding to an image-data sending source (i.e., the imaging apparatus 3 in the example illustrated in FIG. 4) (Step S54). Then, the display device 5 displays an image corresponding to the received image data on the display unit 54 (Step S55). When an end instruction is input by the input unit 52 (YES at Step S56), the display device 5 ends a series of processing. In contrast, when the end instruction is not input by the input unit 52 (NO at Step S56), the process by the display device 5 returns to Step S53. When the process at Step S53 is performed for the second or later time, the control unit 55 determines whether image data is received within a predetermined time since an acquisition notice of latest received image data has been sent (Step S54).

Next, a process performed when the display device 5 does not receive the image data within the predetermined time since the display device 5 has sent the response signal at Step S52 (NO at Step S53) is described. In this case, the display device 5 sends a non-acquisition notice of the image data to the imaging apparatus corresponding to the trigger-signal sending source (Step S57). Then, when the end instruction is input by the input unit 52 (YES at Step S58), the display device 5 ends a series of processing. In contrast, when the end instruction is not input (NO at Step S58), the process by the display device 5 returns to Step S51.

In this manner, the display device 5 displays pieces of image data that are successively sent from each of the imaging apparatuses 1 and 3 on the display unit 54 to perform slideshow.

According to the first embodiment as described above, the search conditions of image data is set so as to contain the condition "image data is created between a) the latest send image data that has most recently been sent among pieces of image data sent from either one of the imaging apparatuses 1 and 3 to the display device 5 and b) the image data that is created at the earliest time after the latest send image data has been created among the pieces of the image data stored in the storage unit 17". Image data to be sent to the display device 5 is determined from among pieces of image data stored in each of the imaging apparatuses 1 and 3 based on the search result that has been sent from the imaging apparatus 3 as a response to the search conditions sent to the imaging apparatus 3. Every time the send-image-data determining unit determines image data to be sent to the display device 5, control is performed to send the determined image data from corresponding one of the imaging apparatuses 1 and 3 to the display device 5. Therefore, it is not necessary to refer to the related information when a playback process is performed. As a result, it is possible to perform the process of successively playing back highly-related images captured by different apparatuses, with low loads.

Furthermore, according to the first embodiment, control of playing back to display images is performed by the display device 5 that is separated from each of the imaging apparatuses 1 and 3. Therefore, played back images can be viewed by a large group of people compared to a conventional situation where images are played back on a display unit of an imaging apparatus.

Moreover, according to the first embodiment, images captured by each of the different imaging apparatuses 1 and 3 are collectively and successively played back. Therefore, it is possible to play back a variety of images in an entertaining manner.

Figure 9:
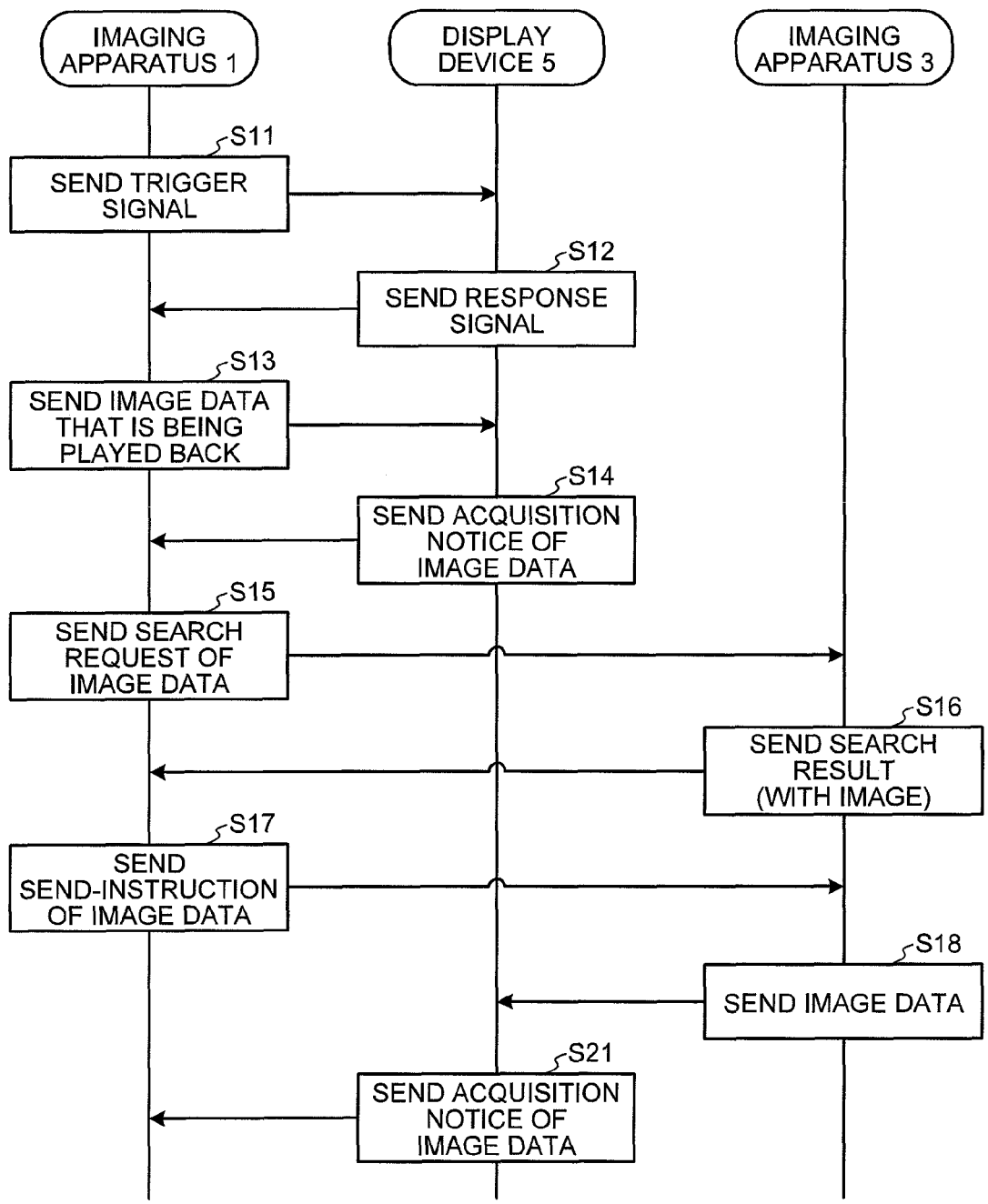
FIG. 9 is a schematic diagram illustrating an outline of a communication sequence performed by an image communication system according to a modified example of the first embodiment.

FIG. 9 is a schematic diagram illustrating an outline of a communication sequence performed by an image communication system according to a modified example of the first embodiment. FIG. 9 illustrates, similarly to FIG. 4, an outline of communication in which the imaging apparatuses 1 and 3 sequentially send image data, and the display device 5 displays slideshow (see FIG. 3). In FIG. 9, processes from transmission of a trigger signal by the imaging apparatus 1 (Step S11) to transmission of image data by the imaging apparatus 3 (Step S18) are the same as those of FIG. 4. Subsequently, the display device 5 sends an acquisition notice of the image data to the imaging apparatus 1 as a trigger-signal sending source (Step S21). When the above communication is performed, the same effects as the first embodiment as described above can be achieved.

A second embodiment of the present invention has the following features: in a communication system including a plurality of imaging apparatuses and a display device, pieces of image data of images to be displayed as slideshow by the display device are sent to the display device via a specific one imaging apparatus. A configuration of the image communication system including an imaging apparatus according to the second embodiment is the same as the image communication system 100 of the first embodiment as described above. Therefore, in the following descriptions, the same reference numerals as those of the first embodiments are used.

Figure 10:
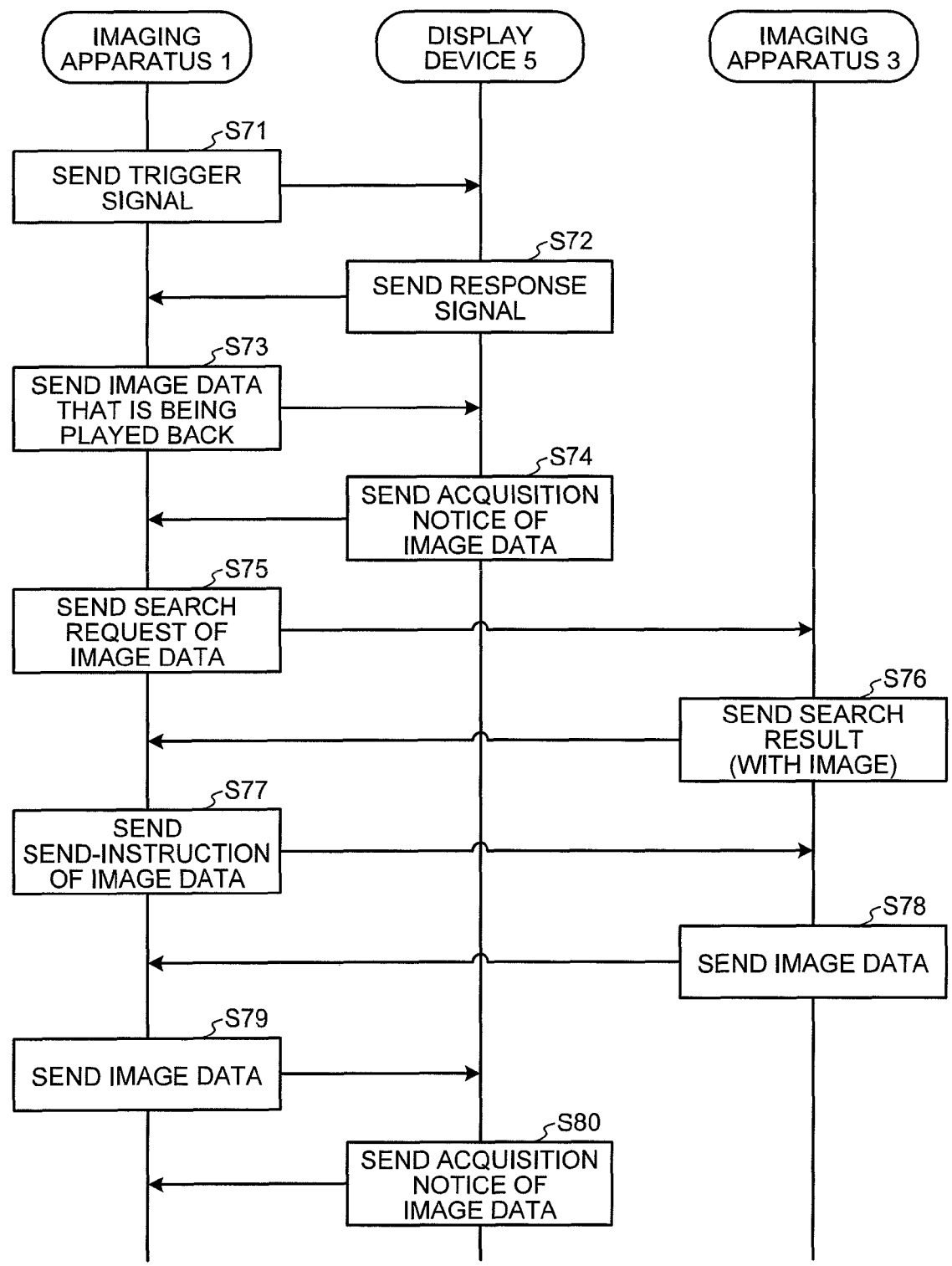
FIG. 10 is a schematic diagram illustrating an outline of a communication sequence performed by an image communication system that includes an imaging apparatus according to a second embodiment of the present invention.

FIG. 10 is a schematic diagram illustrating an outline of a communication sequence performed by the image communication system 100. More specifically, similarly to FIG. 4, a communication sequence is illustrated in which the imaging apparatus 1 sends a trigger signal to the display device 5 and it is detected that image data corresponding to search conditions is present as a result of search by the imaging apparatus 3.

In FIG. 10, processes at Steps S71 to S76, that is, processes from transmission of the trigger signal from the imaging apparatus 1 to the display device 5 (Step S71) to transmission of a search result from the imaging apparatus 3 to the imaging apparatus 1 (Step S76) are the same as the processes at Steps S11 to S16 of FIG. 4, respectively. At Step S77, the imaging apparatus 1 that has received the search result from the imaging apparatus 3 sends to the imaging apparatus 3 a send instruction to send corresponding image data to the imaging apparatus 1 (Step S77). The imaging apparatus 3 that has received the send instruction of the image data sends the corresponding image data to the imaging apparatus 1 (Step S78). The imaging apparatus 1 that has received the image data from the imaging apparatus 3 sends the received image data to the display device 5 (Step S79). The display device 5 that has received the image data from the imaging apparatus 1 sends an acquisition notice of the image data to the imaging apparatus 1 (Step S80).

An outline of a process performed when the imaging apparatus 1 is set to either the shooting mode or the playback mode is the same as the process of the flowchart of FIG. 5. However, details of the process of sending image data for slideshow (Step S43) and the communication process (Step S46) are different from those of the first embodiment.

Figure 11:
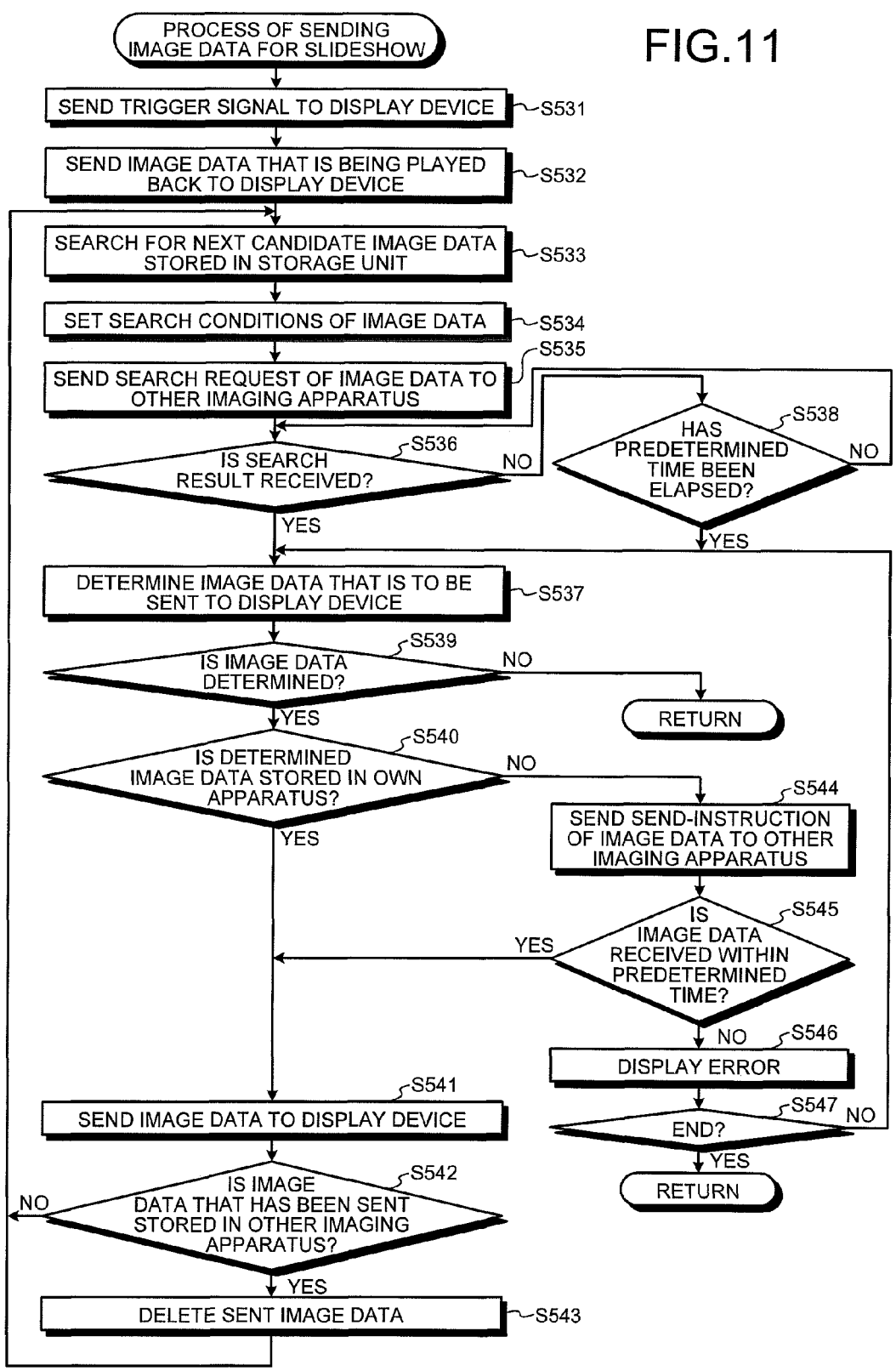
FIG. 11 is a flowchart illustrating details of a process of sending image data for slideshow, which is performed by the imaging apparatus according to the second embodiment.

With reference to a flowchart of FIG. 11, the process of sending image data for slideshow (Step S43) is described in detail. In FIG. 11, processes at Steps S531 to S538 are the same as the processes at Steps S431 to S438 of FIG. 6, respectively. At subsequent step S539, when the send-image-data determining unit 20 determines image data to be sent (YES at Step S539), and if the image data is stored in the storage unit 17 of the imaging apparatus 1 (YES at Step S540), the control unit 22 performs control of reading the image data from the storage unit 17 and sending the image data to the display device 5 via the communicating unit 21 (Step S541). In this case, the image data that has been sent to the display device 5 is image data that is stored in the imaging apparatus 1 itself (NO at Step S542), and then the process by the imaging apparatus 1 returns to Step S533.

When the send-image-data determining unit 20 determines the image data at Step S539 (YES at Step S539), and if the image data is stored in the storage unit 17 of the imaging apparatus 3 (NO at Step S540), the control unit 22 sends to the imaging apparatus 3 a send instruction to send the image data to the imaging apparatus 1 (Step S544). The imaging apparatus 3 that has received the send instruction of the image data from the imaging apparatus 1 sends corresponding image data to the imaging apparatus 1.

When the imaging apparatus 1 receives the image data from the imaging apparatus 3 within a predetermined time since the imaging apparatus 1 has sent the send instruction of the image data (YES at Step S545), the control unit 22 performs control of sending the received image data to the display device 5 (Step S541). In this case, the image data that has been sent by the imaging apparatus 1 is image data that is stored in the imaging apparatus 3 (YES at Step S542). Therefore, the control unit 22 performs control of deleting the image data (Step S543), and then the process returns to Step S533. In this manner, the imaging apparatus 1 deletes image data that has been received from other imaging apparatuses after the imaging apparatus 1 has sent the image data to the display device 5, so that increase in used space in the storage unit 17 can be suppressed.

When the imaging apparatus 1 does not receive the image data from the imaging apparatus 3 within the predetermined time (NO at Step S545), the display unit 13 displays error (Step S546). Then, when an end instruction to end the process of sending the image data for the slideshow is input by the input unit 14 (YES at Step S547), the process by the imaging apparatus 1 returns to the main routine. In contrast, when the end instruction is not input by the input unit 14 (NO at Step S547), the process by the imaging apparatus 1 returns to Step S537.

Figure 12:
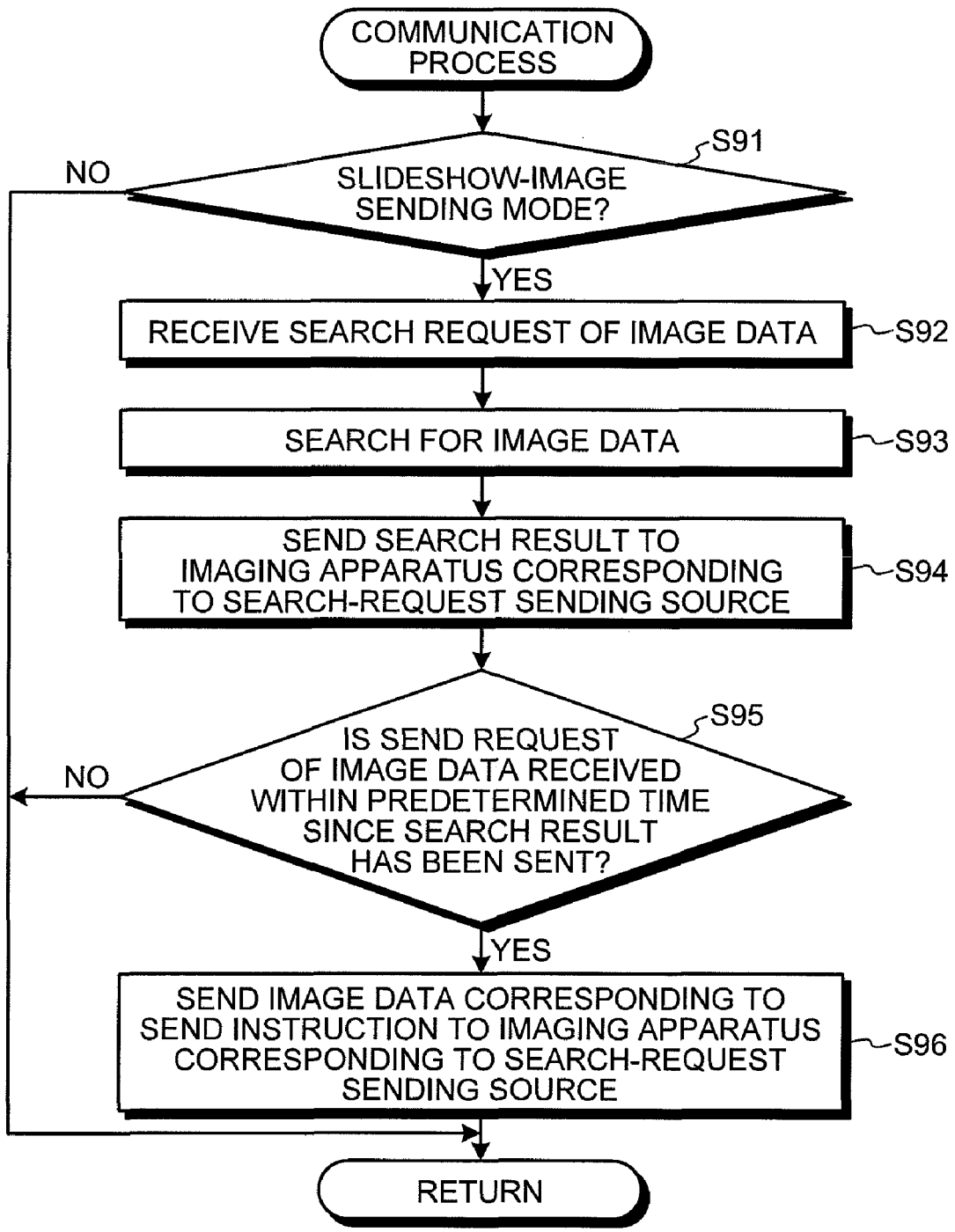
FIG. 12 is a flowchart illustrating details of a communication process performed by the imaging apparatus according to the second embodiment.

Next, with reference to a flowchart of FIG. 12, the communication process (Step S46) is described in detail. In FIG. 12, the imaging apparatus 1 needs to be set to the slideshow-image sending mode (YES at Step S91) to continue the process by the imaging apparatus 1. Therefore, when the imaging apparatus 1 is not set to the slideshow-image sending mode (NO at Step S91), the process by the imaging apparatus 1 returns to the main routine. Described below is a process performed when the imaging apparatus 1 is set to the slideshow-image sending mode (YES at Step S91).

When the imaging apparatus 1 receives a search request of image data from the imaging apparatus 3 as a trigger-signal sending source that has sent the trigger signal to the display device 5 (Step S92), the searching unit 18 searches for image data corresponding to search conditions (Step S93). The search conditions at this time are the same as those of the first embodiment as described above. Then, the imaging apparatus 1 sends a search result to the imaging apparatus 3 (an imaging apparatus corresponding to a search-request sending source) (Step S94). In the second embodiment, the imaging apparatus 3 sends the image data to the imaging apparatus 1, so that when a plurality of pieces of image data satisfies the search conditions, it is sufficient to send, as the search result, only information related to image data having the oldest creation date-time. Accordingly, the imaging apparatus 1 can reduce the amount of data corresponding to the search result, so that the imaging apparatus 1 can send the search result more promptly. The imaging apparatus 1 can be configured to display the image data sent at Step S94 on the display unit 13. In this configuration, the same slideshow as that displayed on the display unit 54 of the display device 5 can be displayed on the display unit 13.

When the imaging apparatus 1 receives a send instruction of the image data from the imaging apparatus 3 within a predetermined time since the imaging apparatus 1 has sent the search result (YES at Step S95), the control unit 22 performs control of reading the requested image data from the storage unit 17 and sending the image data to the imaging apparatus 3 via the communicating unit 21 (Step S96), and then the process returns to the main routine. In contrast, when the imaging apparatus 1 does not receive the send instruction of the image data from the imaging apparatus 3 within the pre-determined time since the imaging apparatus 1 has sent the search result (NO at Step S95), the imaging apparatus 1 does not perform any processing, and the process returns to the main routine.

According to the second embodiment as described above, each of the imaging apparatus 3 and the display device 5 performs communication only with the imaging apparatus 1. Therefore, the communication sequence can be simplified while the same effects as those of the first embodiment as described above can be achieved.

While the first and the second embodiments are described as exemplary embodiments of the present invention, the present invention is not limited to the above two embodiments. For example, the number of the imaging apparatuses included in the image communication system of the present invention can be arbitrary. In this configuration, an imaging apparatus that sends a trigger signal to the display device may be configured such that the imaging apparatus determines an order of display of pieces of image data with respect to a plurality of search results sent from other imaging apparatuses, and controls sending to the display device according to the order of display.

Furthermore, according to the present invention, wire communication can be performed by connecting a plurality of imaging apparatuses and display devices with one another via a communication cable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An imaging apparatus configured to capture an image and create electronic image data of the image, the imaging apparatus comprising:
a communicating unit that transmits and receives information including the image data to and from each of other imaging apparatus having same configuration and a display device that displays the image;

a storage unit that stores therein the image data of the image captured by the imaging apparatus;

a searching unit that searches for image data that satisfies a predetermined condition among pieces of the image data stored in the storage unit;

a search-condition setting unit that sets a search condition of image data so as to contain a condition that the image data to be searched is created between a latest send image data that has most recently been sent among pieces of image data sent from either the imaging apparatus or the other imaging apparatus to the display device and image data that is created at the earliest time after the latest send image data has been created among the pieces of image data stored in the storage unit;

a send-image-data determining unit that determines image data to be sent to the display device among the pieces of image data stored in each of the imaging apparatus and the other imaging apparatus, based on a search result sent from the other imaging apparatus as a response to the search condition that has been set by the search-condition setting unit and sent to the other imaging apparatus; and a control unit that performs control of causing corresponding one of the imaging apparatus and the other imaging apparatus to send, every time the send-image-data determining unit determines image data to be sent to the display device, the image data determined by the send-image-data determining unit to the display device.

2. The imaging apparatus according to claim 1, wherein when receiving search conditions of image data from the other imaging apparatus, the searching unit searches for image data based on the search conditions that has been received from the other imaging apparatus.

3. The imaging apparatus according to claim 1, wherein when the other imaging apparatus stores therein the image data determined by the send-image-data determining unit, the control unit performs control of sending to the other imaging apparatus an instruction to send the image data determined by the send-image-data determining unit to the display device.

4. The imaging apparatus according to claim 3, wherein when receiving search conditions of image data from the other imaging apparatus, the searching unit searches for image data based on the search conditions that has been received from the other imaging apparatus.

5. The imaging apparatus according to claim 3, wherein when the storage unit stores therein the image data determined by the send-image-data determining unit, the control unit performs control of sending the image data determined by the send-image-data determining unit to the display device.

6. The imaging apparatus according to claim 5, wherein when receiving search conditions of image data from the other imaging apparatus, the searching unit searches for image data based on the search conditions that has been received from the other imaging apparatus.

7. The imaging apparatus according to claim 1, wherein when the other imaging apparatus stores therein the image data determined by the send-image-data determining unit, the control unit performs control of sending to the other imaging apparatus an instruction to send the image data determined by the send-image-data determining unit to the imaging apparatus.

8. The imaging apparatus according to claim 7, wherein when receiving search conditions of image data from the other imaging apparatus, the searching unit searches for image data based on the search conditions that has been received from the other imaging apparatus.

9. The imaging apparatus according to claim 7, wherein when the storage unit stores therein the image data determined by the send-image-data determining unit, the control unit performs control of sending the image data determined by the send-image-data determining unit to the display device.

10. The imaging apparatus according to claim 9, wherein when receiving search conditions of image data from the other imaging apparatus, the searching unit searches for image data based on the search conditions that has been received from the other imaging apparatus.

11. The imaging apparatus according to claim 1, wherein when the storage unit stores therein the image data determined by the send-image-data determining unit, the control unit performs control of sending the image data determined by the send-image-data determining unit to the display device.

12. The imaging apparatus according to claim 11, wherein when receiving search conditions of image data from the other imaging apparatus, the searching unit searches for image data based on the search conditions that has been received from the other imaging apparatus.

13. A non-transitory recording medium that stores therein an imaging apparatus program that, when executed by an imaging apparatus, the imaging apparatus including an imaging unit that captures an image and creates electronic image data of the image and a storage unit that stores therein the created image data, causes the imaging apparatus to transmit and receive information including the image data to and from each of other imaging apparatus having same configuration and a display unit that displays the image, wherein the imaging apparatus program causes the imaging apparatus to repeatedly execute setting a search condition of image data so as to contain a condition that the image data to be searched is created between a latest send image data that has most recently been sent among pieces of image data, the pieces of image data being read from the storage unit and sent to the display device or being sent from either the imaging apparatus or the other imaging apparatus to the display device, and image data that is created at the earliest time after the latest send image data has been created among the pieces of the image data stored in the storage unit;

sending a search request of image data based on the search condition set at the setting; receiving a search result sent from the other imaging apparatus as a response to the search request sent at the sending;

determining image data to be sent to the display device from among the pieces of image data stored in each of the imaging apparatus and the other imaging apparatus; and controlling to cause corresponding one of the imaging apparatus and the other imaging apparatus to send, when the image data to be sent to the display device is determined at the determining, the image data determined at the determining to the display device.

* * * * *